(12) United States Patent
Webb

(10) Patent No.: US 8,356,385 B2
(45) Date of Patent: Jan. 22, 2013

(54) LEAF BLOWER WITH HOSE RETAINING DEVICE

(76) Inventor: Terry K. Webb, Tarboro, NC (US)

(*) Notice: Subject to any disclaimer, the term of this patent is extended or adjusted under 35 U.S.C. 154(b) by 422 days.

(21) Appl. No.: 12/793,100

(22) Filed: Jun. 3, 2010

(65) Prior Publication Data
US 2011/0296645 A1     Dec. 8, 2011

(51) Int. Cl.
*A47L 5/00*    (2006.01)
*A47L 9/00*    (2006.01)
(52) U.S. Cl. ................. 15/323; 15/246; 248/75
(58) Field of Classification Search ............... 15/323, 15/312.2, 246, 246.2; 248/75, 76, 77, 78, 248/79; 267/137, 69, 70, 166, 167, 174; 211/70.2, 70.3, 70.5, 70.6, 70.7, 70.8, 85.3, 211/85.7; 24/369
See application file for complete search history.

(56) References Cited

U.S. PATENT DOCUMENTS

| | | | | |
|---|---|---|---|---|
| 2,999,644 A | * | 9/1961 | Nobinger | 239/229 |
| 5,110,075 A | * | 5/1992 | Reid et al. | 248/79 |
| 5,433,288 A | * | 7/1995 | James | 182/3 |
| 5,979,840 A | * | 11/1999 | Hollister et al. | 248/76 |

* cited by examiner

*Primary Examiner* — Mark Spisich
*Assistant Examiner* — Andrew A Horton
(74) *Attorney, Agent, or Firm* — James G. Passé; Passé Intellectual Property, LLC

(57) ABSTRACT

The present invention relates to a backpack leaf blower with a sheppard's hook device mounted on the back pack for the purpose of holding the flexible air hose by rotational force against the hose. The device can be added to an existing backpack or designed into a new device as needed.

4 Claims, 5 Drawing Sheets

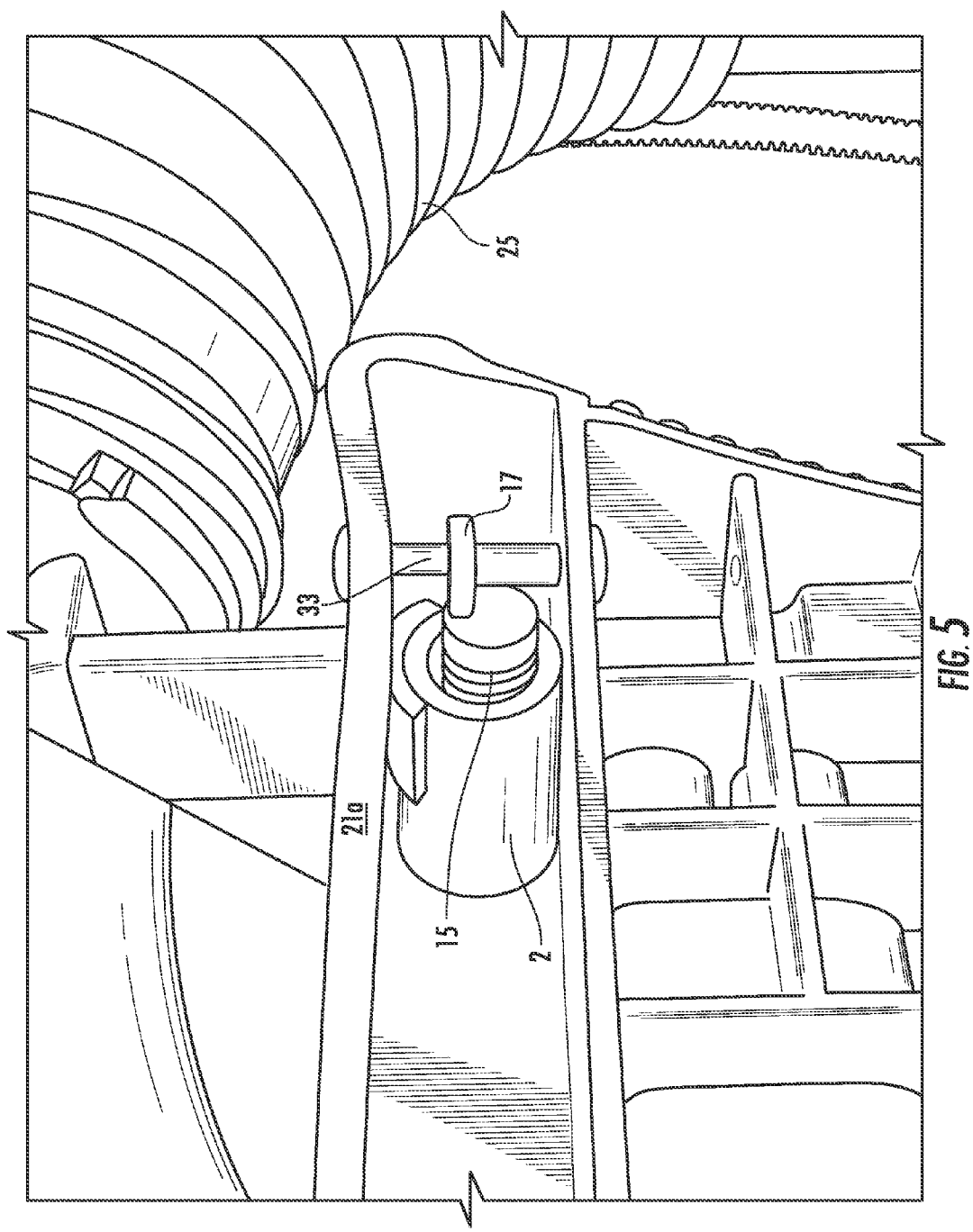

LEAF BLOWER WITH HOSE RETAINING DEVICE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a leaf blower and, in particular, relates to a leaf blower with a sheppard's hook retaining device for holding the leaf blower hose.

2. Description of Related Art

The use of a motorized blower for removing lawn debris, leaves and the like from sidewalks, paved surfaces and yards has been a major way for both home owners and commercial lawn companies to quickly and efficiently clean up lawns and properties. In particular, commercial leaf blowers are designed for heavy duty use and many versions of back pack leaf blowers are used by some individuals and frequently most lawn care companies.

A leaf blower, in general, comprises a gas or electric motor which generates blown air and a rigid or flexible air hose connected to the motor for directing the air produced by the motor into a concentrated stream for blowing leaves and the like to a particular desired location. A general problem with backpack leaf blowers, however, is that the hose is relatively large, flexible and long. When transporting or walking when the blower is not in use the hose frequently gets in the way or ends up dragging on the ground or creating loading problems in a lawn service truck or trailer. This can cause both damage to the blower or damage to other things around the blower and can in some circumstances cause the user to be injured when the dragging hose catches on something as the user is walking. In general, in the decades of use of these devices there has not been a solution to this problem.

BRIEF SUMMARY OF THE INVENTION

The problems described above with commercial back pack leaf blowers has been solved by use of the present invention. By attaching a sheppard's hook shaped device on a back pack blower in front of where the hose exits the blower motor in such a way that it swivels perpendicular to the hose with a spring device that biases the hook toward parallel, a means for quickly and effectively holding the blower hose can be added onto an existing backpack or build onto a new backpack.

In one embodiment the present invention provides a device for retaining the flexible air hose on a backpack leaf blower comprising;
a) a rigid sheppard's hook having a hook portion and a shaft portion wherein the hook portion has a forward leaning bend; and
b) a spring device mounted on the shaft portion in a manner that when the hook is installed on a backpack leaf blower and the flexible hose is placed under the hook, the spring device creates a rotational compression of the hook against the hose restraining the hose from movement.

BRIEF DESCRIPTION OF THE DRAWINGS

FIG. 5 is a perspective view of one embodiment of the present invention where the spring device is attached to the backpack frame.

DETAILED DESCRIPTION OF THE INVENTION

Figure 1:
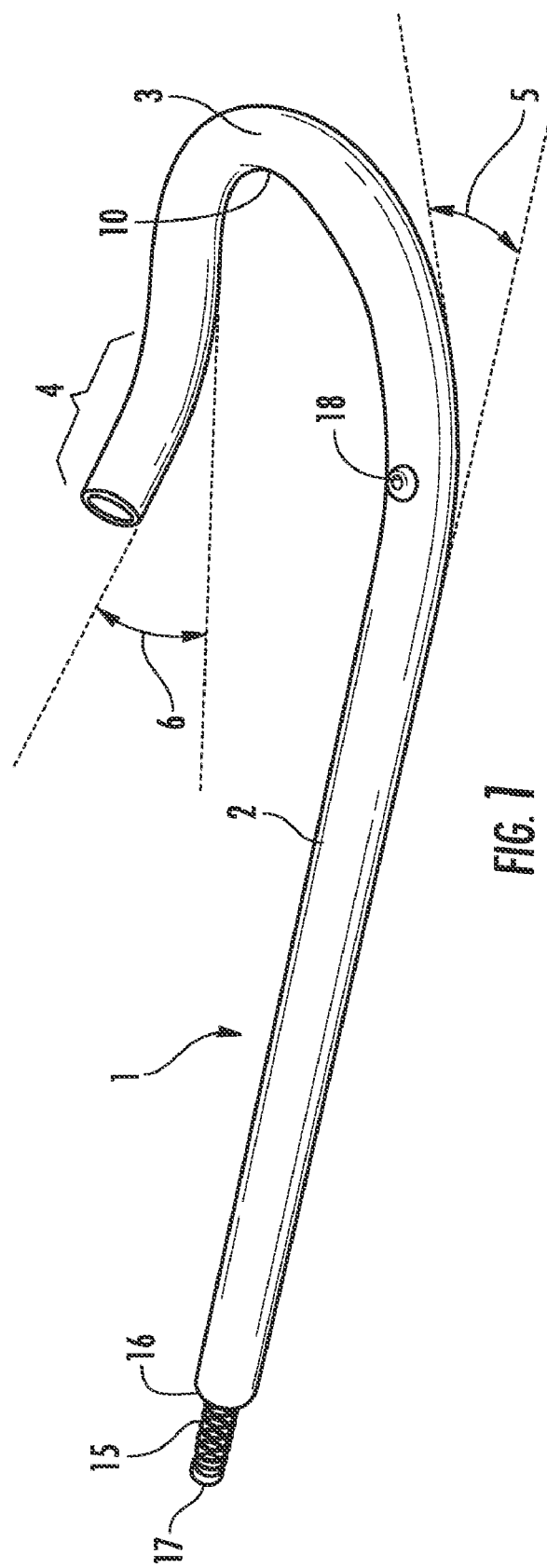
FIG. 1 is a perspective view of an embodiment of the retaining device of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

A "backpack leaf blower" refers to the portable fuel powered motor that produces blown air out a flexible hose and is carried by a backpack frame that is placed on the back of the user and held in place by shoulder straps, belts and the like, just as a regular backpack for camping and the like would be attached. Typically, they are one or two stroke gasoline engines with an air exhaust with the flexible hose connected to the air exhaust (not the engine exhaust). While portions of these air hoses might be rigid, at least a portion is always flexible in order to be able to aim the air at whatever leafs or other debris needs to be blown.

A "rigid sheppard's hook" refers to a particular shape involving a straight shaft portion and a hook portion. The length of the shaft portion is such that it can be mounted on the side of the backpack near the air exhaust. In one embodiment the mounting is next to the backpack frame. The hook portion is a curved shape wherein the portion under the hook is shaped to be as large or larger than the diameter of the flexible hose on the blower. Thus, when the hose is placed underneath the hook the flexible hose will fit all the way to the top of the inside curve of the hook. It can be seen especially in the drawings that an embodiment of the hook is that the hook portion is not linear with the shaft portion and is bent forward. In one embodiment, the bend is from about 5 degrees to about 45 degrees forward but is optimized for holding the hose. In other words the forward bend adds to the gripping effect of the hook. Therefore, one skilled in the art could maximize the effectiveness of the bend based on the particular hose being held as well as other factors in the construction of the device in view of the teaching herein. The sheppard's hook can be made of any rigid material such as metals like aluminum, rigid plastics and the like.

One embodiment of the hook portion includes where the end portion (as shown in the drawings) has a more forward bend than the hook portion itself. While the entire hook portion can be in the same plane, the end portion bend can aid in clearing other items on the blower and aid in gripping the hose further.

In order to maximize the gripping action of the hook portion there is a "spring device" associated with the sheppard's hook. The spring device is attached to the hook in a manner that when the hook is installed on a backpack leaf blower, there is a rotational force placed on the sheppard's hook. This rotational force allows the hook to be in a relaxed position and rotated to a tensioned position. The hose is placed under the hook in the tensioned position and since the hook wishes to rotate back to a relaxed position, the hook will exert pressure on the flexible hose thus creating a gripping pressure to keep the hose and restraining the hose from falling out from underneath the hook. During that rotational pressure, the bend of the hook further aids in gripping the hose placed underneath the hook. While the gripping action will not prevent all movement, it will prevent movement substantially enough to prevent the hose from falling free from the hook.

In one embodiment the spring device is a metal spring such as a coil spring.

However, any spring device such as other types of springs, elastomeric devices such as rubber bands or other elastomers or any device that generally causes the rotation action on the sheppard's hook is also contemplated. In order to create the rotational movement, one end of the spring device is attached to the sheppard's hook, for example, on the shaft and the other affixed to someplace on the backpack itself on the frame, motor or the like. Attachment can be by conventional means such as screws, hooking means, loops, fasteners, or the like.

The sheppard's hook is mounted on the backpack near the air exhaust on the same side as the exhaust such that the flexible hose can easily be bent underneath the hook when in use. Typically, the hook is parallel to the hose in the relaxed position and perpendicular to the hose in the retaining position. Once again, this can be seen with clarity in the drawings. In one embodiment, the sheppard's hook is placed essentially in the plane of the back pack frame. However, where the hose flexes, the exact position of the air exhaust and the like can be used by one skilled in the art to optimally position the hook on the backpack for each individual backpack leaf blower.

Mounting of the device on the frame can be by any means which allows the sheppard's hook to rotate as described above, and not slip up or down once properly positioned. It also would allow rotation without substantial wobble or the like. In one embodiment there are partial or full channels for the shaft portion to rotate in. In another embodiment it is mounted right next to the back pack frame itself and the edge of the frame used to aid in rotation with channels positioned along the edge.

Now referring to the drawings, FIG. 1 is a perspective view of a sheppard's hook 1 of the present invention. The sheppard's hook 1 consists of the shaft portion 2 attached to the hook portion 3. The hook has end portion 4. As can be seen in the drawing, the hook portion 3 has a forward bend of angle 5, in this example about thirty degrees and wherein the end portion also has a different bend angle 6. Typically, the under curve 10 is where the flexible hose is positioned during use.

In this embodiment, the spring device is coil spring 15 running on the inside of the hollow (aluminum) sheppard's hook with only a portion sticking out the bottom end 16 of shaft portion 2. The spring 15 runs up the inside length of the shaft 2 and is attached to sheppard's hook 1 by retaining screw 18. The opposite end of spring 15 depicts loop 17 which can be used to attach the spring to the backpack and create the rotation tension.

Figure 2:
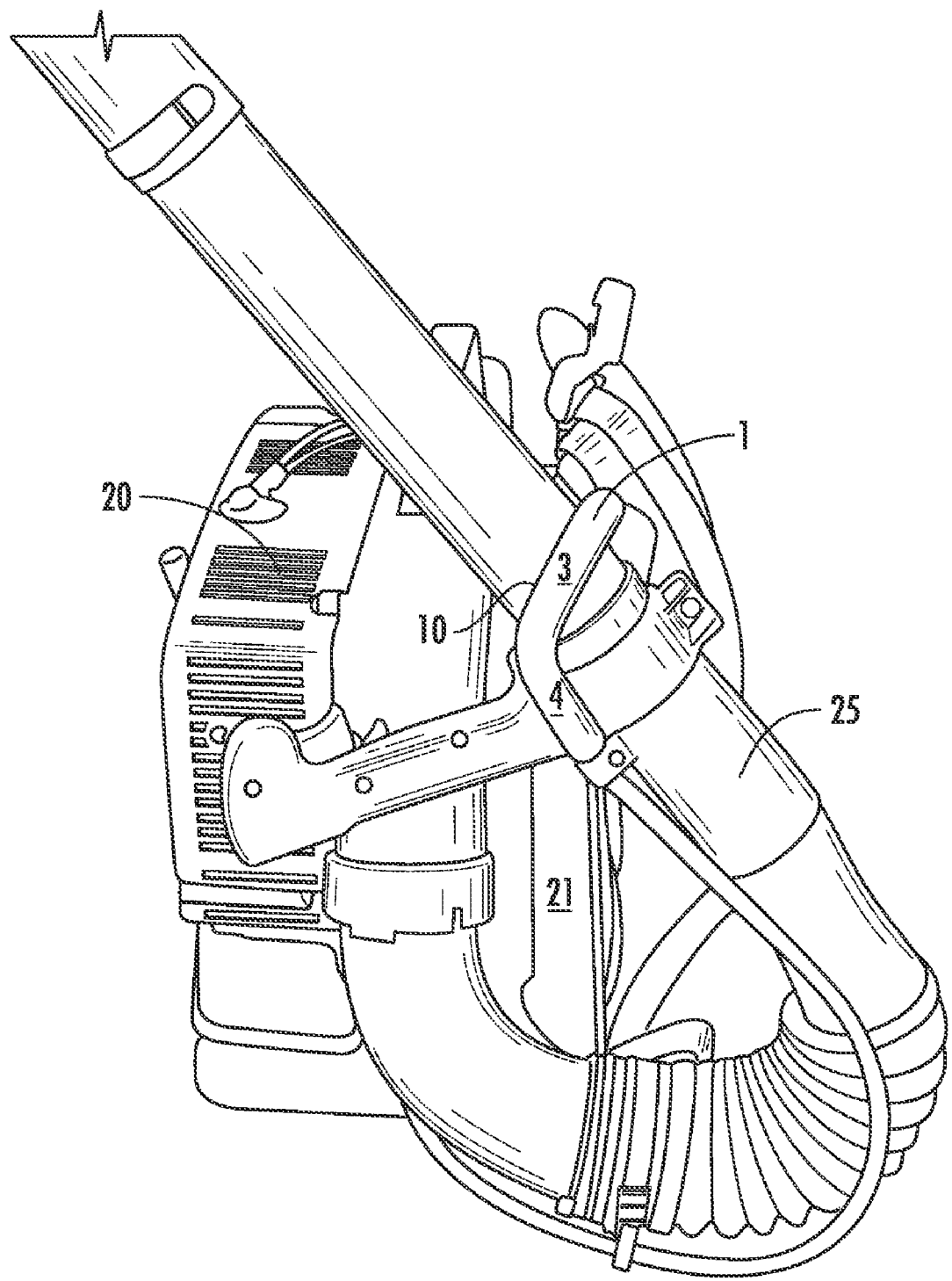
FIG. 2 is a perspective view of an embodiment of the present device mounted on a back pack leaf blower.

FIG. 2 is a perspective embodiment of the present invention where a sheppard's hook 1 is mounted and in use on a gasoline powered backpack leaf blower 20 with backpack frame 21. In this view flexible hose 25 is placed on the underside 10 of hook portion 3 and is held in place by the rotational force of the hook 1 rotation backwards as shown in following figures. Note in this embodiment that the flexible portion itself is not under the hook but a rigid portion, however, absent a flexible portion, it would not bend to be retained under the hook portion 3. Accordingly, the flexible or rigid portion can be placed under hook 3 and it just depends on where the rigid and flexible portions are in the individual models to determine where exactly it will be gripped by the hook portion 3.

Figure 3:
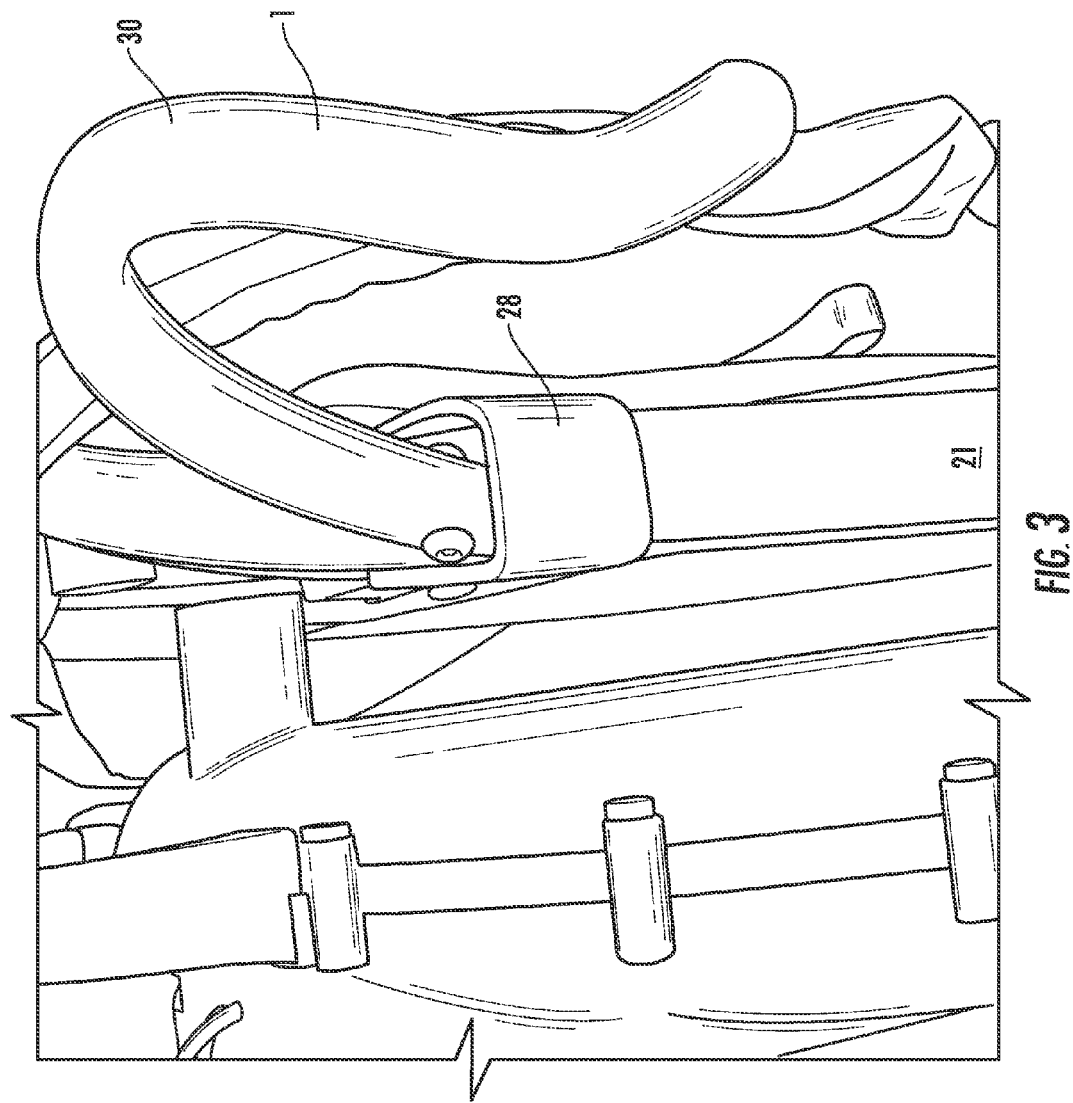
FIG. 3 is a perspective view of an embodiment of the present invention in the tensioned position.
Figure 4:
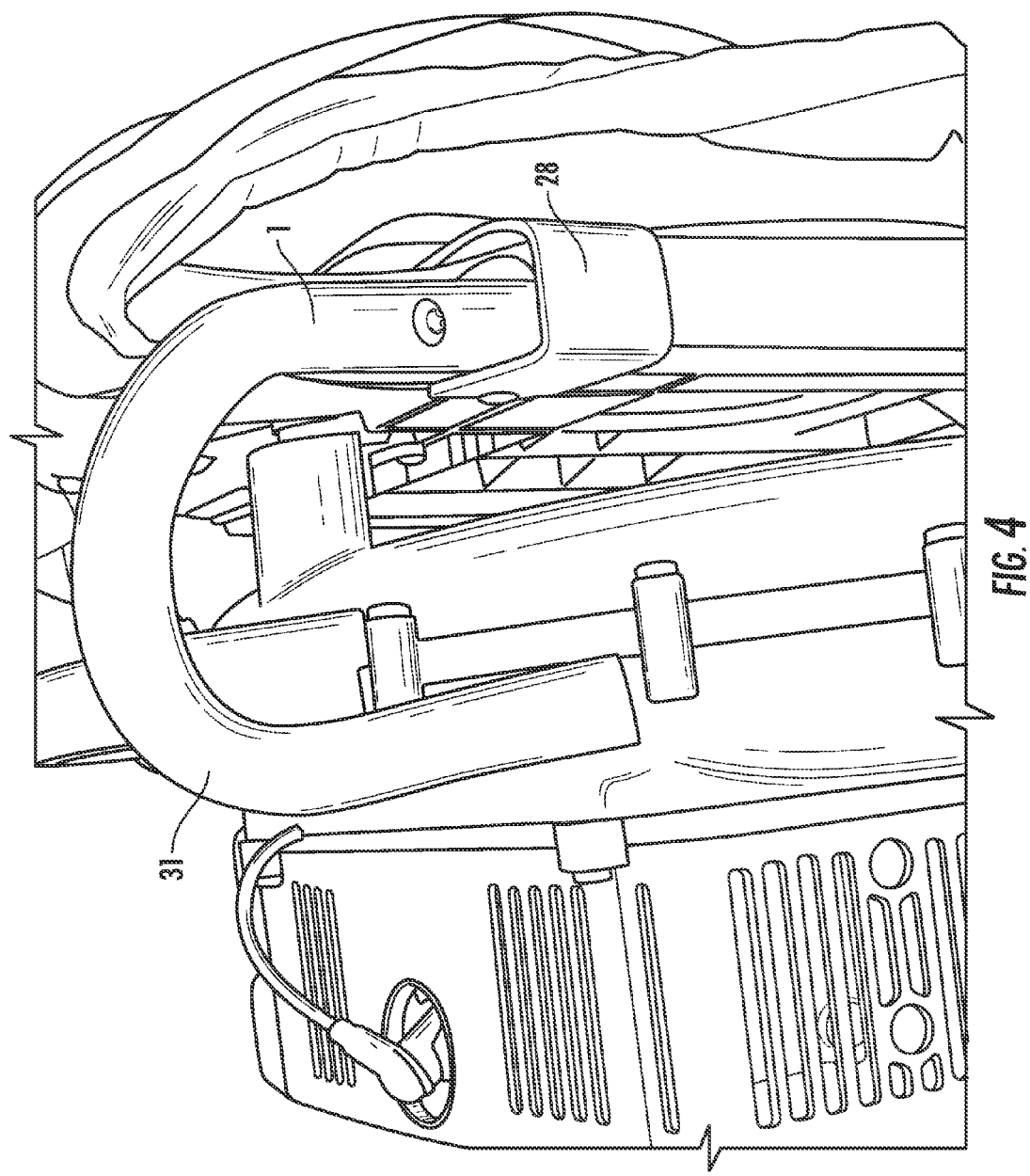
FIG. 4 is a perspective view of an embodiment of the present invention in the relaxed position.

FIG. 3 shows a close up perspective of the sheppard's hook 1 rotationally mounted in the end of the backpack frame 21 and held in place with U clamp 28. In this view the flexible hose is removed for clarity, but the sheppard's hook is in the tensioned position 30 and is mounted such that if released, the hook 1 will torsionally rotate to the relaxed position 31 in FIG. 4.

FIG. 5 shows the bottom of backpack frame 21a. There the shaft portion 2 can be seen exiting the bottom 21a and the spring 15 attached to pin 33 via spring loop 17, thus fixing it torsionally against the backpack frame 21. Clearly other attachments would be used for other spring devices or other backpack leaf blower frames, but in view of this embodiment other means could clearly be envisioned within the scope of this invention though applicant reserves the right to only claim the specific embodiments shown and depicted herein.

Once again, the exact length of the shaft portion, the exact curve of the hook portion, as well as the diameter of the mounting channel and the various parts of the present invention including attachment devices and the like, can be altered by one skilled in the art without changing either the spirit or the nature of the present invention. Clearly the specific embodiment details an embodiment with use of a specific backpack blower and modification of the specific embodiment and variations could be determined without undue experimentation in view of the disclosures of the present invention.

The manufacture of the exact device will depend on the materials chosen to manufacture the hook as well as forming the shaft for rotation of the shaft portion of the hook. The changes to the present invention would be well within the scope and skill in the art.

What is claimed is:

1. A device for retaining a flexible air hose on a backpack leaf blower comprising;
   a) a rigid sheppard's hook having a hook portion and a shaft portion wherein the hook portion has a forward leaning bend; and
   b) a spring device mounted on the shaft portion in a manner that when the hook is installed on a backpack leaf blower and the flexible hose is placed under the hook, the spring device creates a rotational compression of the hook against the hose restraining the hose from movement wherein the device is attached to a backpack leaf blower and wherein the hook is parallel to the flexible hose when in a relaxed position and perpendicular to the flexible hose when retaining the hose .

2. A device according to claim 1 wherein the spring device is a coil spring.

3. A device according to claim 2 wherein the coil spring is positioned inside the shaft portion and wherein a first end is affixed to the shaft and a second end is affixed to the blower.

4. A device according to claim 1 wherein an end portion of the hook portion has more forward bend than the remainder of the hook portion.

* * * * *